United States Patent
Laiho et al.

(10) Patent No.: US 6,907,028 B2
(45) Date of Patent: Jun. 14, 2005

(54) CLOCK-BASED TIME SLICING

(75) Inventors: Kimmo Laiho, Turku (FI); Tommi Auranen, Turku (FI)

(73) Assignee: Nokia Corporation (FI)

( * ) Notice: Subject to any disclaimer, the term of this patent is extended or adjusted under 35 U.S.C. 154(b) by 652 days.

(21) Appl. No.: 10/075,434

(22) Filed: Feb. 14, 2002

(65) Prior Publication Data

US 2003/0153369 A1 Aug. 14, 2003

(51) Int. Cl.[7] .................................................. H04J 3/16
(52) U.S. Cl. ...................................................... 370/347
(58) Field of Search ................................ 370/347, 441, 370/442, 351, 352, 485, 318, 321, 337, 338, 466, 468, 470, 474, 529, 527; 455/13.4

(56) References Cited

U.S. PATENT DOCUMENTS

| | | | |
|---|---|---|---|
| 4,449,248 A | | 5/1984 | Leslie et al. |
| 4,601,586 A | | 7/1986 | Bahr et al. |
| 5,224,152 A | | 6/1993 | Harte |
| 5,241,542 A | * | 8/1993 | Natarajan et al. ........... 370/311 |
| 5,307,376 A | | 4/1994 | Castelain et al. |
| 5,359,607 A | | 10/1994 | Nguyen et al. |
| 5,371,734 A | | 12/1994 | Fischer |
| 5,513,246 A | | 4/1996 | Jonsson et al. |

(Continued)

FOREIGN PATENT DOCUMENTS

| | | |
|---|---|---|
| DE | 10164665 A1 | 12/2001 |
| EP | 0577322 A1 | 6/1993 |
| WO | WO 00/36861 | 6/2000 |
| WO | WO 00/67449 A1 | 11/2000 |
| WO | WO 01/31963 | 5/2001 |
| WO | WO 01/72076 | 9/2001 |
| WO | WO 02/01879 | 1/2002 |
| WO | WO 02/03728 | 1/2002 |
| WO | WO 02/03729 | 1/2002 |

OTHER PUBLICATIONS

Written Opinion from PCT/IB03/00694 dated May 3, 2004.
Huang, Nen–Fu, et al.; "Architectures and Handoff Schemes for CATV–Based Personal Communications Network", Infocom '98, Seventeenth Annual Joint Conference of the IEEE Computer and Communications Societies, Proceedings. IEEE San Francisco, CA, USA; Mar. 29–Apr. 2, 1998, New York, New York, USA, IEEE, US, Mar. 29, 1998, pp. 748–755.
European Search Report for EP 03255819, dated Jan. 29, 2004.
Digital Video Broadcasting (DVB); DVB specification for Data Broadcasting, European Broadcasting Union, EN 301 192 V1.2.1 (Jun. 1999).
Apostolis K. Salkintzis et al. "Performance Analysis of a Downlink Mac Protocol with Power–Saving Support", IEEE Transactions on Vehicular Technology, vol. 49, No. 3, May 2000, pp. 1029–1040.
Apostolis K. Salkintzis et al. "An In–Band Power–Saving Protocol for Mobile Data Networks" IEEE Transactions on Communications, vol. 46, No. 9, Sep. 1998, pp. 1194–1205.
Draft Report of the 52nd Meeting of DVB GBS, EBU Headquarters, Geneva, Jun. 25th/27th, 2002. pp. 1–12.

*Primary Examiner*—Dang Ton
(74) *Attorney, Agent, or Firm*—Banner & Witcoff, Ltd.

(57) ABSTRACT

A system that allows mobile terminals to periodically remove power from at least some components is disclosed. The mobile terminal receives bursts of content. Some of the bursts of content include relative time information identifying the transmission time of a subsequent burst of content. The mobile terminal may remove power from a receiving module during times when the mobile terminal is not scheduled to receive content bursts.

29 Claims, 4 Drawing Sheets

U.S. PATENT DOCUMENTS

| | | | |
|---|---|---|---|
| 5,537,410 A * | 7/1996 | Li .............................. 370/465 |
| 5,539,925 A | 7/1996 | Yli-Kotila et al. |
| 5,568,513 A | 10/1996 | Croft et al. |
| 5,613,235 A | 3/1997 | Kivari et al. |
| 5,657,313 A | 8/1997 | Takahashi et al. |
| 5,671,253 A | 9/1997 | Stewart ...................... 375/316 |
| 5,710,756 A | 1/1998 | Pasternak et al. |
| 5,732,068 A | 3/1998 | Takahashi et al. |
| 5,745,860 A | 4/1998 | Kallin |
| 5,764,700 A | 6/1998 | Mäkinen |
| 5,799,033 A | 8/1998 | Baggen |
| 5,870,675 A | 2/1999 | Tuutijärvi et al. |
| 5,883,899 A | 3/1999 | Dahlman et al. |
| 5,886,995 A | 3/1999 | Arsenault et al. |
| 5,910,949 A * | 6/1999 | Bilstrom et al. ............ 370/337 |
| 5,936,965 A | 8/1999 | Doshi et al. |
| 5,970,059 A | 10/1999 | Ahopelto et al. |
| 5,995,845 A | 11/1999 | Lardennois |
| 6,047,181 A | 4/2000 | Suonvieri |
| 6,069,901 A | 5/2000 | Hulyalkar et al. .......... 370/509 |
| 6,088,412 A | 7/2000 | Ott |
| 6,167,248 A | 12/2000 | Hamalainen et al. |
| 6,175,557 B1 | 1/2001 | Diachina et al. |
| 6,226,278 B1 | 5/2001 | Bursztenj et al. |
| 6,256,357 B1 | 7/2001 | Oshima |
| 6,262,982 B1 | 7/2001 | Donahue et al. |
| 6,262,990 B1 | 7/2001 | Ejiri |
| 6,266,536 B1 | 7/2001 | Janky |
| 6,282,209 B1 | 8/2001 | Kataoka et al. |
| 6,285,686 B1 | 9/2001 | Sharma |
| 6,295,450 B1 | 9/2001 | Lyer |
| 6,335,766 B1 | 1/2002 | Twitchell et al. |
| 6,339,713 B1 | 1/2002 | Hansson et al. |
| 6,356,555 B1 | 3/2002 | Rakib et al. |
| 6,359,923 B1 * | 3/2002 | Agee et al. .................. 375/130 |
| 6,477,382 B1 | 11/2002 | Mansfield et al. |
| 6,490,727 B1 | 12/2002 | Nazarathy et al. |
| 6,549,592 B1 | 4/2003 | Jones ........................ 375/354 |
| 2002/0010763 A1 | 1/2002 | Salo et al. |
| 2002/0025777 A1 | 2/2002 | Kawamata et al. |
| 2002/0122465 A1 | 9/2002 | Agee et al. .................. 375/141 |
| 2003/0067943 A1 | 4/2003 | Arsenault et al. |
| 2003/0152107 A1 | 8/2003 | Pekonen |

* cited by examiner

US 6,907,028 B2

CLOCK-BASED TIME SLICING

FIELD OF THE INVENTION

The invention relates to broadcast systems. More particularly, the invention provides systems and methods that reduce power consumption of mobile terminals between transmitted bursts.

BACKGROUND OF THE INVENTION

Conventional digital video broadcast (DVB) systems transmit streams of content to digital video broadcast receivers via a transmission medium. The transmission medium typically includes a coaxial cable, satellite or wireless broadcast station. Each transmission medium has a limited bandwidth and typically divides the available bandwidth into a plurality of channels. FIG. 1 illustrates a typical transport stream 100 that is transmitted to a digital video broadcast receiver. As is shown in FIG. 1, the typical transport stream is continuous and occupies a bandwidth that is less than the maximum bandwidth of a channel.

Mobile terminals are increasingly being used to provide new services to users. Mobile terminals are popular because they are light weight and do not require a connection to a stationary power source, such as a standard electrical outlet. One of the limitations of mobile terminals is the battery life of the mobile terminal. Processing of low bit rate content, such as streaming content, can have a negative impact on the life of a mobile terminal battery. As a result, users can only receive and view streaming content for a limited time period. Prior art solutions to the limited battery life problem that results from receiving and processing streaming content include carrying extra batteries and utilizing more expensive or larger batteries. Obviously, the prior art solutions take away from the attractiveness of mobile terminals.

Therefore, there exists a need in the art for systems and methods that allow mobile terminals to receive and process streaming content while efficiently utilizing the batteries of mobile terminals.

SUMMARY OF THE INVENTION

One or more of the above-mentioned needs in the art are satisfied by the disclosed systems and methods that periodically remove power from at least some components of mobile terminals. Streaming or bursty content is transformed into bursts of content having a bandwidth greater than the original content. Power may be removed from receiving modules in between time periods in which the bursts of content are received. Relative timing information regarding the timing of bursts may be included in the bursts. Among other advantages, the use of relative timing information allows mobile terminals to remove power from receiving modules without requiring strict synchronization with a broadcast source and the calculation of latency delays.

A first embodiment of the invention provides a method of providing streaming content. The method includes receiving a continuous information stream containing content and creating first and second bursts that contain portions of the content. A relative time period between a transmission of the first burst and a transmission of the second burst is encoded in the first burst.

In another embodiment, a method of processing bursts of content data received at a mobile terminal is provided. The method includes receiving a first burst of content and extracting a relative time period until a transmission of a second burst of content. After receiving the first burst of content, power is removed from at least a portion of the mobile terminal for a time period less than the relative time period.

In yet another embodiment of the invention, a mobile terminal that processes bursts of content is provided. At least some of the bursts of content include relative time information relating to a next burst. The mobile terminal includes a receiving module that receives bursts of content and an extraction module configured to extract relative time periods from the bursts of content. A power management module removes power from at least the receiving module for power off time periods that correspond to the relative time periods.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 2:
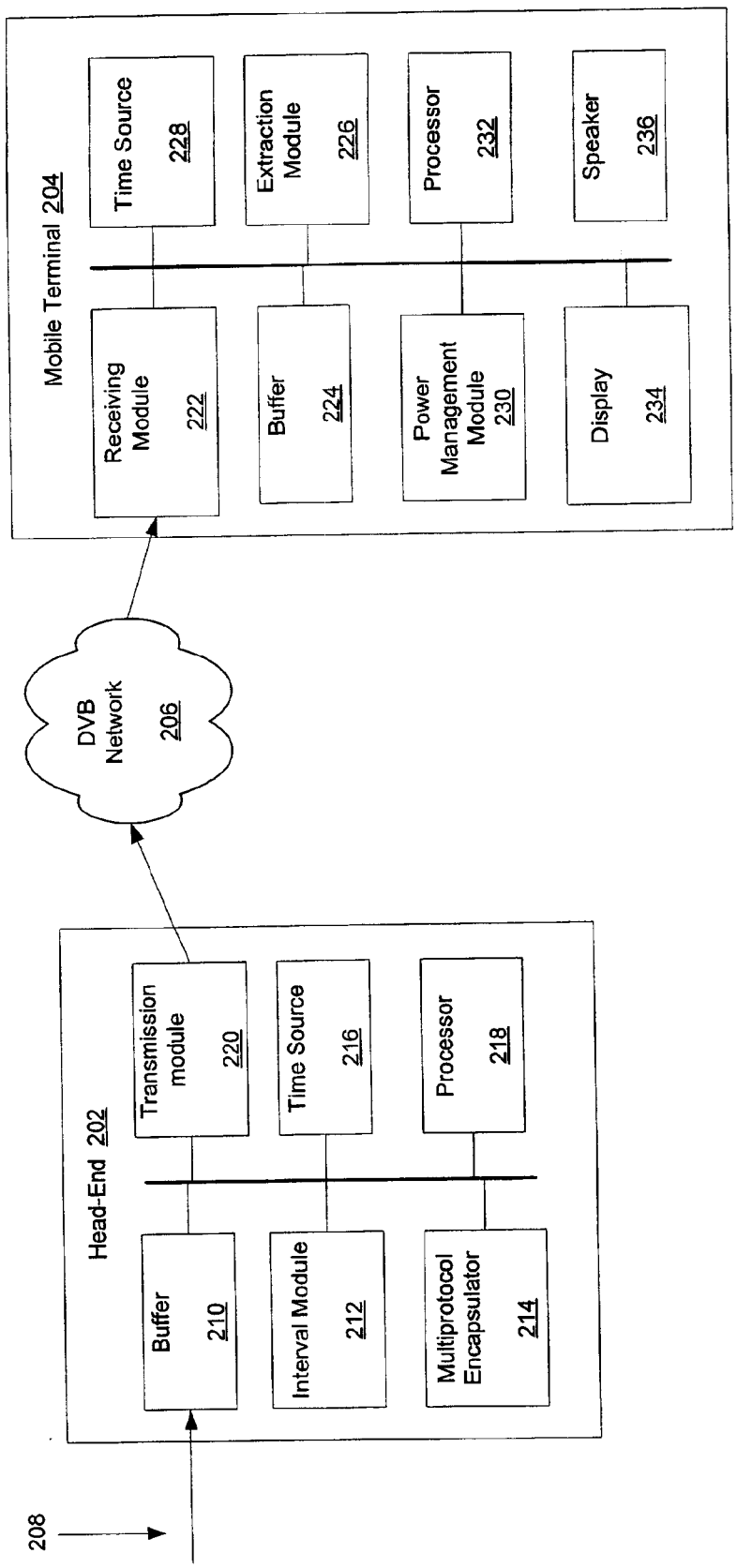
FIG. 2 illustrates a system for transmitting and receiving bursts of content, in accordance with an embodiment of the invention.

FIG. 2 illustrates a system for transmitting and receiving bursts of content in accordance with an embodiment of the invention. The content may include audio content, video content and/or data. A head-end 202 transmits bursts of content to a mobile terminal 204 via a digital video broadcast network 206. A single mobile terminal is shown for illustration purposes only and with the understanding that head-end 202 may transmit bursts of content to numerous mobile terminals or other devices. Digital video broadcast network 206 may include coaxial cable, a wireless transmission station, a satellite or other transmission medium. Of course, aspects of the present invention may utilize networks other than digital video broadcast networks, such as pure Internet protocol networks.

Head-end 202 may receive an information signal 208 at a buffer 210. Buffer 210 may be a memory that stores segments of information signal 208. An interval module 212 may be used to determine a relative time period between the transmission of bursts of content. The relative time period determined by interval module 212 may be a function of a maximum bandwidth of network 206, a maximum bandwidth of a channel of network 206 or other factors, such as power management efficiencies of the head-end and/or mobile terminal.

A multiprotocol encapsulater 214 may be used to format the content that will be transmitted to network 206. In one embodiment of the invention, the relative time period determined by interval module 212 is encapsulated into the content formatted by multiprotocol encapsulater 214. A time source 216 may be used by interval module 212 to calculate the relative time period between bursts of content. A processor 218 may be programmed with computer-executable instructions to receive the content from multiprotocol encapsulater 214 and format the data into bursts having a bandwidth and interval determined by interval module 212.

Figure 1:
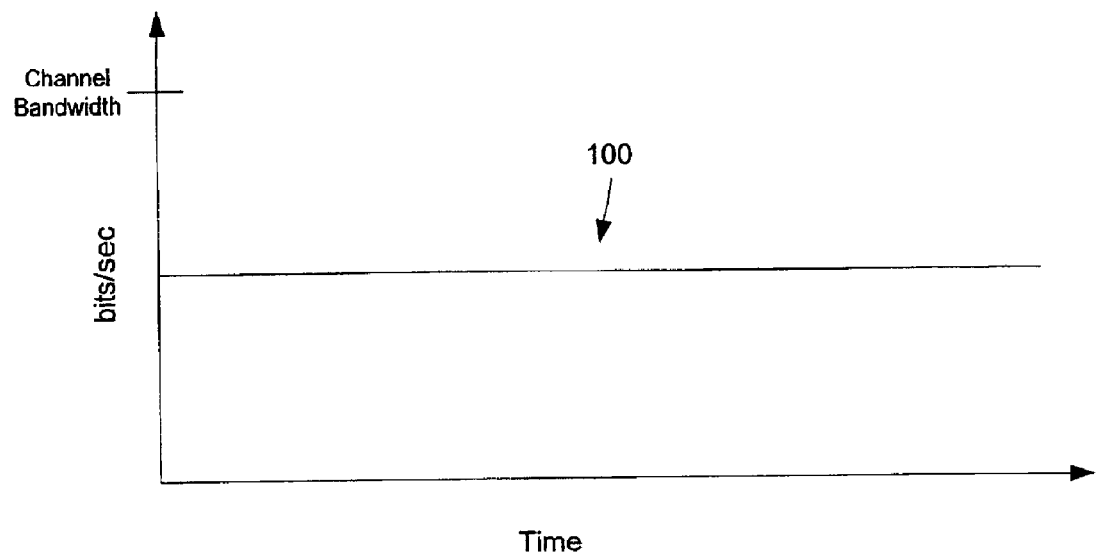
FIG. 1 shows a typical transport stream that is transmitted to a digital video broadcast receiver.
Figure 3:
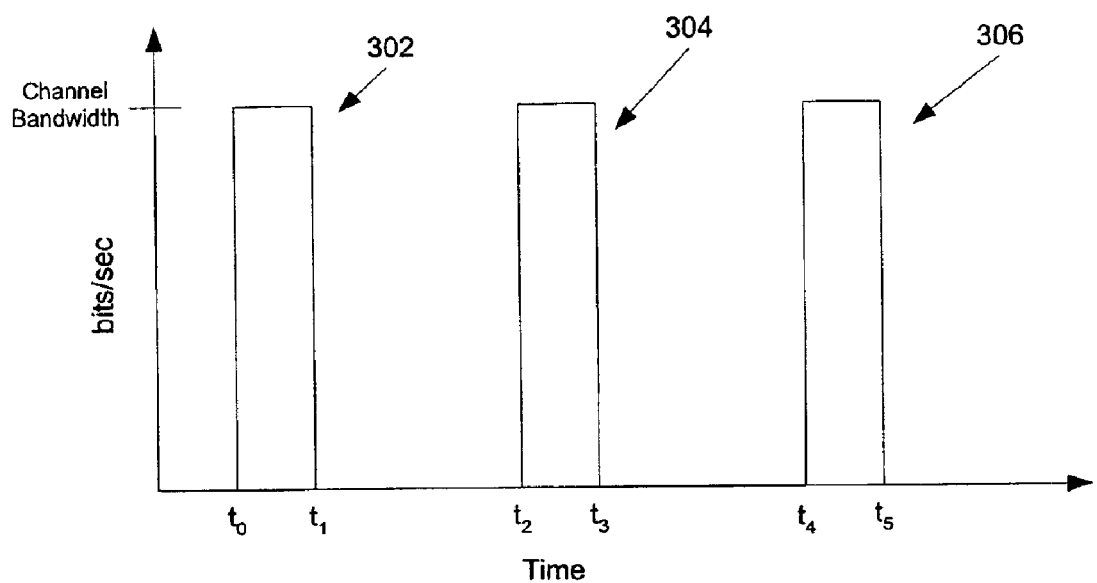
FIG. 3 illustrates bursts of content that have been formatted in accordance with an embodiment of the invention.

FIG. 3 illustrates a series of bursts 302, 304 and 306 that may result from the processing performed by processor 218. Unlike conventional transport stream 100 shown in FIG. 1, bursts 302, 304 and 306 shown in FIG. 3 are periodic and consume substantially all of the available channel bandwidth. As will be described in detail below, one of the advantages of the transmission scheme shown in FIG. 3 is that power may be removed from components of mobile terminal 204 between the reception of bursts. For example, between time periods $t_1$ and $t_2$, no content is received at mobile terminal 204. Therefore, power may be removed from at least receiving module 222. Power may also be removed between time $t_3$ and $t_4$. One skilled in the art will appreciate that any power removed from any of the components of mobile terminal 204 may be reapplied shortly before the expiration of a time interval between bursts to ensure that mobile terminal 204 is ready to receive the next transmitted burst.

A transmission module 220 transmits the content bursts to network 206 for ultimate delivery to mobile terminal 204. Of course, aspects of the present invention may be used with systems that include more than one information source 208. The corresponding additional content bursts may be transmitted in different channels of network 206 or may be time division multiplexed with the first set of content bursts. Transmission module 220 may include components for performing time division multiplexing. Such components are readily available and well-known to those skilled in the art.

Receiving module 222 may be coupled to a buffer 224. Buffer 224 may store the received content bursts for later processing. An extraction module 226 may be used to extract the relative time periods from the received bursts of content. A time source 228 may be used as a local time source. In one embodiment, time source 228 may extract time information from standard transport stream time and date tables. However, because timing information is preferably relative rather than absolute, it is not necessary to synchronize the head-end and the mobile terminal to a common time source. The head-end and the mobile terminal may have independent time sources.

Mobile terminal 204 may include a power management module 230 that receives the relative timing information extracted by extraction module 226 and time information received from time source 228 to remove and apply power to receiving module 222. As has been described above, power may be removed from at least receiving module 222 at times in which content bursts are not received at mobile terminal 204. A processor 232 may be included to perform functions such as receiving the content bursts stored in buffer 224 and creating a continuous content stream.

Mobile terminal 204 may be implemented with a mobile telephone, personal digital assistants, or other portable electronic devices that may be used to present audio, data and/or visual content to a user. Accordingly, mobile terminal 204 may include a display 234 for displaying visual content to the user and/or a speaker 236 for presenting audio content to a user.

Power management module 230 selectively applies power to one or more components of mobile terminal 204 based on relative time period information. As a result, it is not necessary for time source 216 and time source 228 to be synchronized. It is sufficient that each time source has a predetermined accuracy. The predetermined accuracy may be selected based on efficiency requirements of mobile terminal 204. Relatively more accurate time sources allow mobile terminal 204 to apply power at shorter time periods before the anticipation of receipt of bursts. With less accurate time sources, power must be applied sooner to compensate for the inaccuracies and ensure that mobile terminal 204 is ready to receive bursts. Another advantage to utilizing relative time period information is that latency delays may be automatically considered. In particular, since the latency delays of successive bursts are likely to be substantially the same, the relative time period information is sufficient for determining when to apply and remove power.

Figure 4:
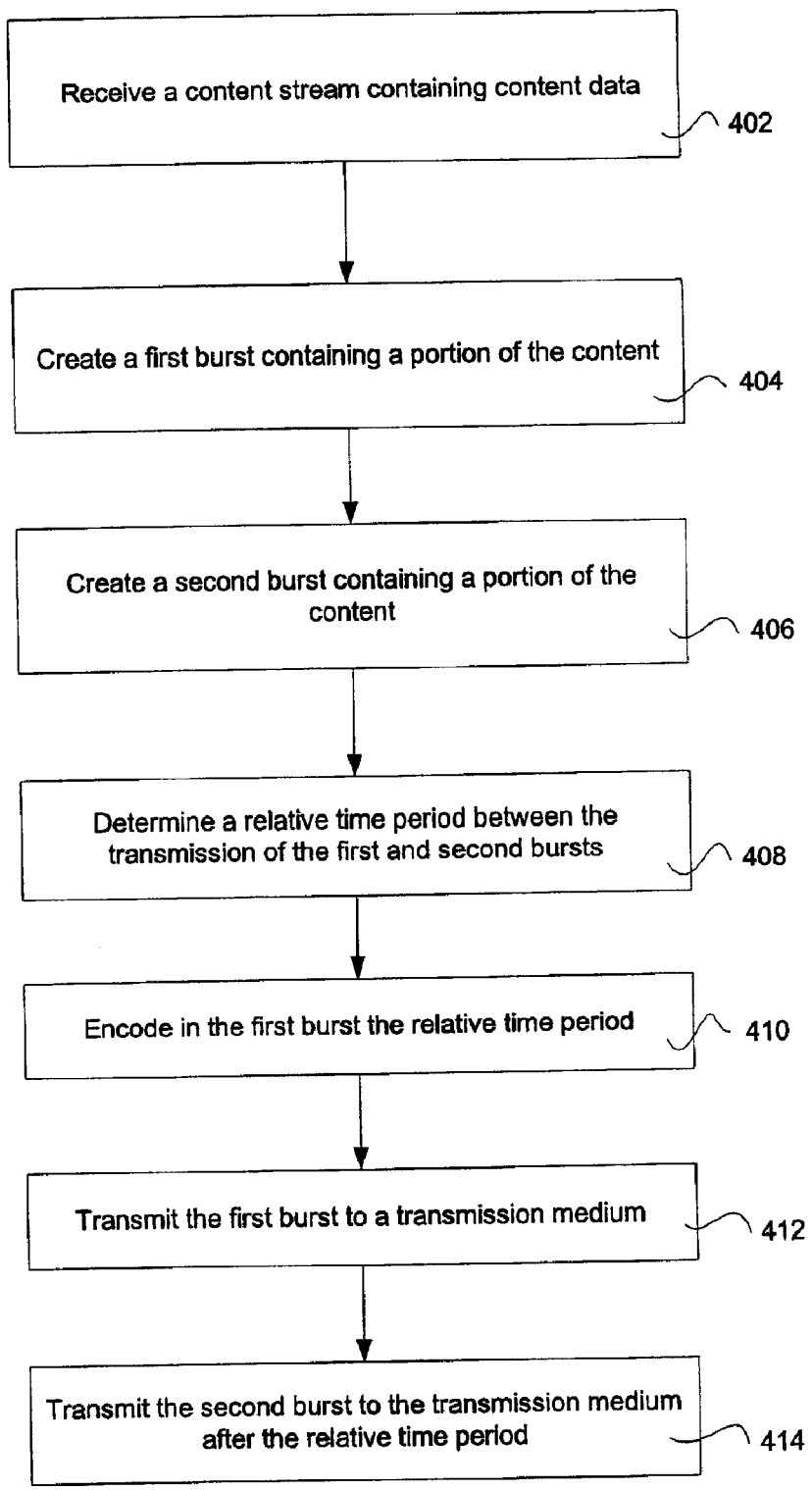
FIG. 4 illustrates a method of transmitting bursts of content containing relative timing information to a mobile terminal, in accordance with an embodiment of the invention.

FIG. 4 illustrates a method for transmitting bursts of content containing relative timing information to a mobile terminal, in accordance with an embodiment of the invention. First, in step 402, the head-end receives a content stream. The content stream may be continuous. The content stream may be a conventional information signal received from an information source, such as a television station. Alternatively, the content stream may be a conventional transport stream, such as transport stream 100 (shown in FIG. 1).

Next, the head-end creates a first burst containing a portion of the content in step 404. The bandwidth of the first burst is greater than the bandwidth of the original content stream received in step 402. Similarly, in step 406, the head-end creates a second burst containing a portion of the content.

Next, in step 408 the head-end determines a relative time period between the transmission of the first and second bursts. The relative time period may be a function of the content of the original content stream, the available bandwidth of the transmission medium or the available bandwidth of a channel of the transmission medium. The relative time period is encoded in the first burst of content data in step 410. The relative time period may be included in an Internet protocol (IP) packet, a multiprotocol encapsulated frame, any other packet frame, a 3G or GPRS channel or modulation data, such as transmitter parameter signaling.

In step 412, the first burst is transmitted to the transmission medium. After the relative time period has elapsed, the second burst is transmitted to the transmission medium in step 414.

The relative time period may identify a time period from the beginning of transmission of one burst to the beginning of transmission of another burst. A duration of the burst may also be included. In one embodiment of the invention, each burst may include relative time period information that determines the time between the transmission subsequent bursts. For example, the second burst may include relative time period information that determines the length of time before transmission of a third burst. In other embodiments of the invention, relative time period information may be included in bursts only when the relative time period between the transmission of bursts changes.

Figure 5:
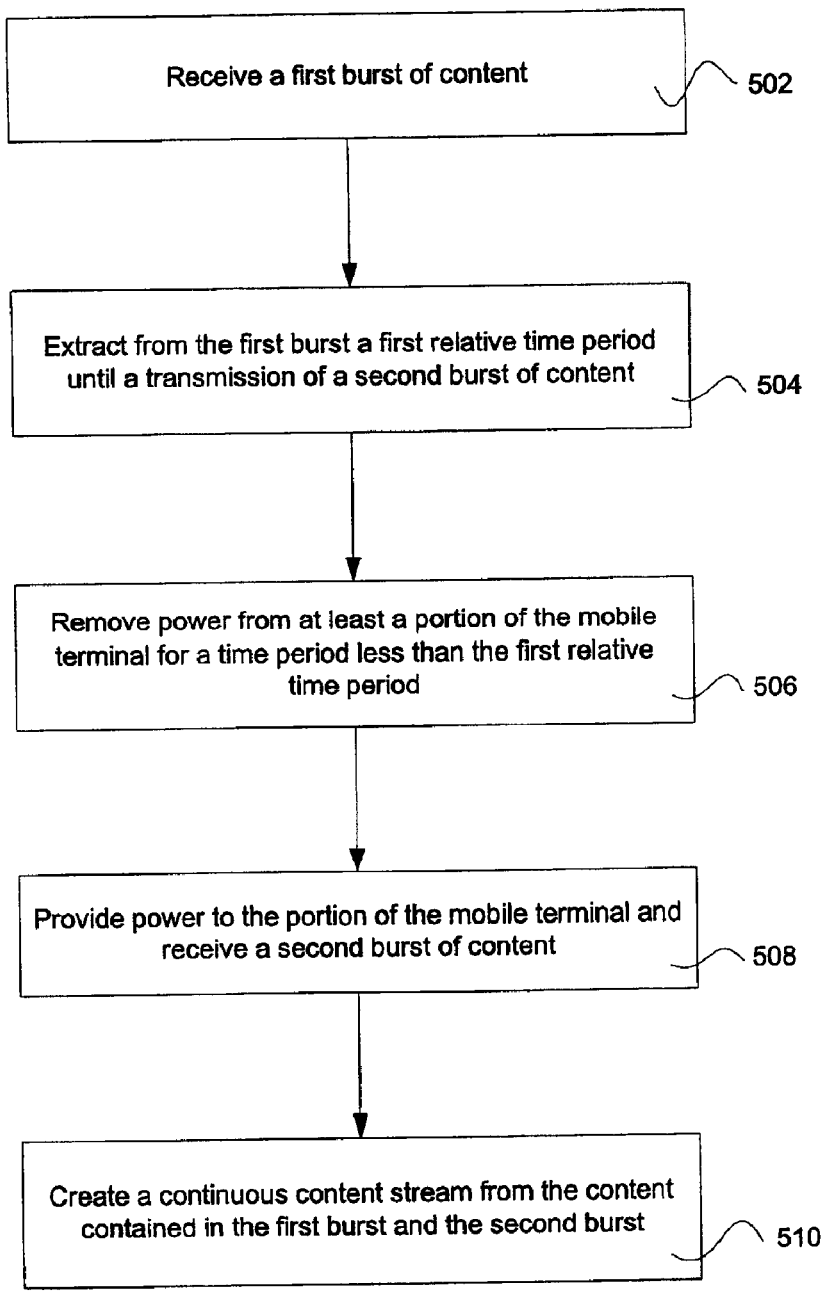
FIG. 5 illustrates a method that may be used by a mobile terminal to receive and process bursts of content in accordance with an embodiment of the invention.

FIG. 5 illustrates a method that may be used by a mobile terminal to receive and process bursts of content in accordance with an embodiment of the invention. First in step 502 a first burst of content is received. The burst may be received at receiving module 222 (shown in FIG. 2). In step 504, a first relative time period is extracted from the first burst. The first relative time period determines the time interval between transmission of the first burst and the transmission of the second burst.

In step 506 power is removed from at least a portion of the mobile terminal for a time period less than the first relative time period. As stated above, it might be desirable to apply power to the components, from which power was removed, shortly before the expiration of the first relative time period to ensure that the mobile terminal is configured and ready to receive the additional bursts of content. In one embodiment in the invention, power is removed from receiving module 222. Receiving module 222 may include components that consume relatively large amounts of power, such as a demodulator. Of course, mobile terminal 204 may be configured so that power is selectively applied to additional components. For example, power may be removed from substantially all of the components of the mobile terminal in between the reception of bursts of content. Power may be removed from substantially all of the components when, for example, the mobile terminal is receiving content that will be presented to a user at a later time. Mobile terminal 204 may receive the content and store the content in a memory for later retrieval.

In step 508, power is provided to the components from which power was removed and the mobile terminal receives a second burst of content. The mobile terminal may also be configured to examine all of the bursts of content to determine if additional relative time information has been included. For example, mobile terminal 204 may examine the second burst of content to determine if a relative time period between the transmission of the second burst of content and the transmission of a third burst of content has been included. Finally, in step 510 a continuous content stream is created from the content contained in the first and second bursts. Of course, a continuous content stream may be created from content contained in any number of bursts.

One aspect of the invention includes a mechanism for operating a mobile terminal when a burst is lost. A burst may be lost because of interference or some error or fault condition. When a burst is lost, the mobile terminal may be configured to operate in a constant on state until another burst is received. In one embodiment, the mobile terminal may be programmed to operate in a constant on state after a predetermined length of time since the reception of a burst. The predetermined length of time may be chosen to slightly exceed the maximum expected length of time between bursts.

The present invention has been described with reference to mobile terminals. Selectively removing power from at least some components of a mobile terminal may provide longer battery life. The selective removal of power may also reduce interference and/or reduce the generation of heat. As a result, aspects of the present invention may be used with other broadcast receivers that do not include batteries or that are not mobile.

While the invention has been described with respect to specific examples including presently preferred modes of carrying out the invention, those skilled in the art will appreciate that there are numerous variations and permutations of the above described systems and techniques that fall within the spirit and scope of the invention.

We claim:

1. A method of providing streaming content, the method comprising:
    (a) receiving an information stream containing content;
    (b) creating a first burst containing a first portion of the content;
    (c) creating a second burst containing a second portion of the content; and
    (d) encoding in the first burst a first relative time period between a transmission of the first burst and a transmission of the second burst.

2. The method of claim 1, further including:
    (e) transmitting the first burst to a transmission medium; and
    (f) transmitting the second burst to the transmission medium at a time determined by the first relative time period.

3. The method of claim 2, wherein the bandwidth of the first burst corresponds to a maximum bandwidth of a channel of the transmission medium.

4. The method of claim 2, wherein the bandwidth of the first burst is less than a maximum bandwidth of a channel of the transmission medium.

5. The method of claim 2, wherein the bandwidth of the first burst corresponds to a maximum bandwidth of the transmission medium.

6. The method of claim 1, further including:
    (e) encoding in the second burst a second relative time period between a transmission of the second burst and a transmission of a third burst that contains a portion of the content.

7. The method of claim 1, wherein (d) further includes encoding a duration of the first burst in the first burst.

8. The method of claim 1, wherein the first time period encoded in (d) is encoded in a multiprotocol encapsulation frame.

9. The method of claim 1, wherein the first time period encoded in (d) is encoded in an Internet protocol packet.

10. The method of claim 1, wherein the first time period encoded in (d) is encoded in digital video broadcast modulation data.

11. A method of processing bursts of content data received at a terminal, the method comprising:
    (a) receiving a first burst of content;
    (b) extracting from the first burst a first relative time period until a transmission of a second burst of content; and
    (c) after (a), removing power from at least a portion of the mobile terminal for a time period less than the first relative time period.

12. The method of claim 11, wherein the at least a portion of the mobile terminal comprises a receiving module.

13. The method of claim 12, wherein the receiving module comprises a packet filter.

14. The method of claim 11, further including:
    (d) after (c), providing power to the at least a portion of the mobile terminal and receiving a second burst of content; and
    (e) after (d), removing power from the at least a portion of the mobile terminal for the time period less than the first relative time period.

15. The method of claim 14, further including:
    (f) creating a content stream from the content contained in the first burst and the second burst.

16. The method of claim 11, further including:
    (d) after (c), providing power to the at least a portion of the mobile terminal and receiving a second burst of content;
    (e) extracting from the second burst a second relative time period until a transmission of a third burst of content; and
    (f) after (d), removing power from the at least a portion of the mobile terminal for a time period less than the second relative time period.

17. The method of claim 16, further including:
(g) creating a content stream from the content contained in the first burst and the second burst.

18. The method of claim 11, wherein (b) comprises extracting the first relative time period from a multiprotocol encapsulation frame.

19. The method of claim 11, wherein (b) comprises extracting the first relative time period from an Internet protocol packet.

20. The method of claim 11, wherein (b) comprises extracting the first relative time period from digital video broadcast modulation data.

21. A mobile terminal that processes bursts of content, at least some of the bursts of content include relative time periods, the mobile terminal comprising:

a receiving module that receives bursts of content;

an extraction module configured to extract relative time periods from the bursts of content; and a power management module that removes power from at least the receiving module for power off time periods that correspond to the relative time periods.

22. The mobile terminal of claim 21, further including a time source coupled to the power management module and that provides relative time information to the power management module.

23. The mobile terminal of claim 22, further including a buffer that stores the bursts of content.

24. The mobile terminal of claim 23, further including a processor that creates a continuous content stream from the bursts of content.

25. The mobile terminal of claim 21, wherein the extraction module extracts the relative time periods from multiprotocol encapsulation frames.

26. The mobile terminal of claim 21, wherein the extraction module extracts the relative time periods from Internet protocol packets.

27. The mobile terminal of claim 21, wherein the extraction module extracts the relative time periods from digital video broadcast modulation data.

28. A mobile terminal that processes bursts of content, at least some of the bursts of content include relative time data indicating a relative time between bursts, the mobile terminal comprising:

a means for receiving bursts of content;

a means for extracting relative time periods from the bursts of content; and a means for removing power from at least the means for receiving for power off time periods that correspond to the relative time periods.

29. A receiver that processes bursts of content, at least some of the bursts of content include relative time periods, the video receiver comprising:

a receiving module that receives bursts of content;

an extraction module configured to extract relative time periods from the bursts of content; and a power management module that removes power from at least the receiving module for power off time periods that correspond to the relative time periods.

* * * * *